Oct. 27, 1936.  J. S. FETYKO  2,058,858
SAFETY DEVICE FOR PRESSURE INDICATORS
Filed Aug. 14, 1935
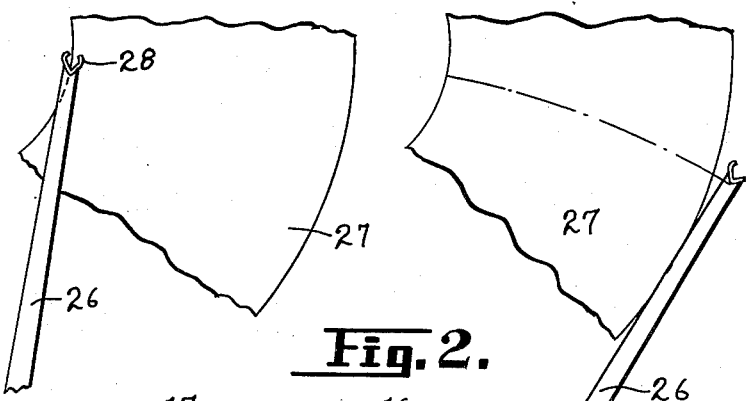
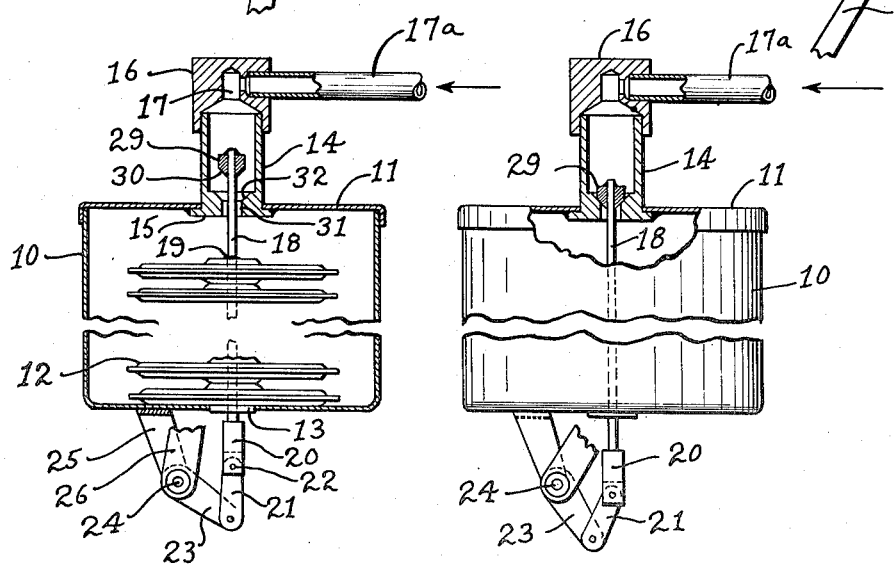
INVENTOR
*Joseph S. Fetyko*
BY
*H. G. Manning*
ATTORNEY Patented Oct. 27, 1936

2,058,858

UNITED STATES PATENT OFFICE 2,058,858

SAFETY DEVICE FOR PRESSURE INDICATORS

Joseph S. Fetyko, Union City, Conn.

Application August 14, 1935, Serial No. 36,159

1 Claim. (Cl. 73—110)

This invention relates to pressure measuring instruments, and more particularly to a pressure indicator of the type having an expansible hollow metallic bellows responsive to fluctuations of fluid pressure.

One object of this invention is to provide a pressure indicator of the above nature in which provision is made of means for automatically shutting off the fluid from the bellows in case the pressure of said fluid becomes excessive.

A further object is to provide a pressure indicator of the above nature in which the bellows member is contained within a cylindrical casing, the latter having a valve connected to one of its flat faces, and in which said valve is adapted to be automatically closed by means mounted on the bellows member.

A further object of the invention is to provide a device of the above nature which will be simple in construction, inexpensive to manufacture, easy to install and manipulate, compact, and very efficient and durable in use.

With these and other objects in view, there has been illustrated on the accompanying drawing a preferred form in which the invention may be conveniently embodied in practice.

In the drawing:

Fig. 1 represents a vertical sectional view through the device embodying the invention, in which the fluid pressure is exterior of the bellows and the indicating pointer is at the limit of its innermost stroke.

Fig. 2 is a side elevation of the device with portions broken away, showing the pointer at the limit of its outermost stroke and the valve closed.

Referring now to the drawing in which like reference numerals denote corresponding parts throughout the several views, the numeral 10 indicates a cup-shaped cylindrical casing having a flat cover disc 11 hermetically sealed at the top end thereof, said casing 10 being adapted to be mounted within a recording instrument in any suitable manner. Located in the casing 10 is mounted a collapsible metal hollow bellows 12, herein shown as comprising a series of circular articulated sections hermetically sealed together as a unit, but it will be understood that other types of bellows may be employed if desired within the spirit and scope of the invention.

In the preferred form of the invention shown in Figs. 1 and 2, the lowermost section of the bellows 12 is provided with a central open neck 13 which is rigidly secured, as by soldering, within a central aperture formed in the flat base of the casing 10.

Supported coaxially upon the cover disc 11 is a tubular valve bushing 14 which, as shown in Fig. 1, passes down through said disc 11, and is provided at its lower end with a flange 15 which seats under the inner side of said disc, being secured thereto, as by soldering. The upper open end of the bushing 14 is provided with a cylindrical hollow cap member 16 having an angular passage 17 provided with a side opening for receiving a tube 17a connected with the fluid under pressure. In the first form of the invention (Figs. 1 and 2) the fluid is located in the space in the casing 10 surrounding the bellows member 12, and consequently, as the pressure of said fluid increases, the bellows 12 will collapse and cause the upper section of said bellows to move downwardly toward the bottom of the casing 10.

Located in the central part of the bellows 12 is a vertical valve rod 18 which is rigidly secured, as by a ring of solder 19, to the upper movable section of said bellows. The rod 18 extends downwardly freely through the other sections of the bellows to a point below the casing 10, where it is provided with a knuckle jaw 20 having a bifurcated lower end for pivotally receiving the upper end of an intermediate connecting link 21, as by a transverse pin 22. The link 21 in turn is pivotally connected to an arm 23 which is rigidly mounted upon a horizontal shaft 24, rotatably journaled in a depending bracket 25 affixed to the underside of the casing 10, said shaft 24 carrying an upstanding elongated indicating arm 26.

From the above construction it will be obvious that vertical longitudinal movements of the valve rod 18 will be converted into angular oscillations of the arm 26, causing the latter to sweep across the face of a slowly rotating dial 27. The outer free end of the indicating arm 26 may be provided with a suitable pen 28 for recording on the dial the pressure fluctuations which are transmitted to the casing 10.

Instruments of this general type are often subjected to excessive pressures which sometimes result in fracturing or over-straining the bellows or indicating mechanism to such an extent as to render the instrument inaccurate or unfit for further use. To overcome this disadvantage, the valve rod 18, as shown in Figs. 1 and 2, is made to extend upwardly into the interior of the valve bushing 14, and is provided on its upper end with a valve head 29 having a conical lower face 30. The bushing 14 is formed with a restricted bottom aperture 31 which is surrounded by a conical valve seat 32 upon which said valve head 29 is adapted to fit.

Operation

In the operation of the safety device, the fluid under pressure will enter the casing 10 through the tube 17a and the bushing 14, causing the bellows 12 to collapse to a degree dependent upon the pressure. The valve rod 18 will thus be caused to move downwardly and the indicating arm 26 will record on the dial the exact pressure existing within the casing.

If the pressure within the casing 10 exceeds a predetermined amount, the valve rod 18 will be carried down by the bellows 12 sufficiently to bring the valve head 29 into contact with the valve seat 32, thus shutting off the pressure from the casing and protecting the bellows from being further collapsed. The greater the pressure, the tighter will the valve head 29 be pressed against the valve seat 32.

While there have been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claim.

Having thus fully described the invention, what is claimed as new, and for which it is desired to secure Letters Patent, is:

In a pressure indicating instrument, a cylindrical casing, a flat cover member hermetically sealed to the top of said casing, a hollow bellows member attached to the base of said casing, a tubular bushing secured to said cover and having a conical valve seat, said bushing being connected to a source of fluid under pressure, an elongated indicator operating rod coaxially mounted in said casing and extending entirely through said bellows, said rod being connected to the free end of said bellows, a conical valve head on the upper end of said rod and located within said bushing for engaging said valve seat to protect the bellows and indicator operating rod from further movement and possible injury when the pressure exceeds a predetermined amount.

JOSEPH S. FETYKO.